United States Patent
Holland et al.

(10) Patent No.: US 7,947,384 B2
(45) Date of Patent: May 24, 2011

(54) FIRE RESISTANT GLAZINGS

(75) Inventors: John Richard Holland, Ormskirk (GB); Karikath Sukumar Varma, Southport (GB); David William Holden, Greater Manchester (GB)

(73) Assignee: Pilkington PLC, St. Helens (GB)

( * ) Notice: Subject to any disclaimer, the term of this patent is extended or adjusted under 35 U.S.C. 154(b) by 558 days.

(21) Appl. No.: 11/543,615

(22) Filed: Oct. 5, 2006

(65) Prior Publication Data

US 2007/0026242 A1 Feb. 1, 2007

Related U.S. Application Data

(62) Division of application No. 10/221,924, filed on Sep. 17, 2002, now Pat. No. 7,189,285.

(51) Int. Cl.
*B32B 15/04* (2006.01)

(52) U.S. Cl. ......... 428/702; 428/428; 428/688; 428/689

(58) Field of Classification Search .................. 428/410, 428/428, 432, 697, 702, 913, 920, 921, 688, 428/689; 252/606, 601

See application file for complete search history.

(56) References Cited

U.S. PATENT DOCUMENTS

| 4,451,312 | A | * | 5/1984 | Nolte | 156/99 |
| 4,873,146 | A | * | 10/1989 | Toussaint et al. | 428/428 |
| 5,434,006 | A | * | 7/1995 | Goelff et al. | 428/428 |

* cited by examiner

*Primary Examiner* — Keith D Hendricks
*Assistant Examiner* — Lauren Robinson
(74) *Attorney, Agent, or Firm* — Marshall & Melhorn, LLC

(57) ABSTRACT

Solutions comprising a sodium silicate waterglass having a modulus of less than 3 and at least 8% by weight of an organic polyhydroxy compound such as glycerol are useful in the production of interlayers used in fire resistant glass laminates. The solutions are dried on a flat surface such as glass to produce a clear intumescent interlayer having improved impact resistance. The dried interlayer may be removed from the surface in the form of an elastomeric material which may also be used as an interlayer in a fire resistant glazing.

2 Claims, No Drawings

FIRE RESISTANT GLAZINGS

CROSS REFERENCE TO RELATED APPLICATIONS

This application is a divisional application of prior U.S. application Ser. No. 10/221,924, filed on Sep. 17, 2002 now U.S. Pat. No. 7,189,285. U.S. application Ser. No. 10/221,924 is pending as of the filing date of this application. U.S. application Ser. No. 10/221,924 is hereby incorporated by reference as if set forth in its entirety herein.

BACKGROUND OF THE INVENTION

This invention relates to novel compositions comprising a waterglass, to fire resistant glass laminates comprising a waterglass based intumescent interlayer and to methods for the production of such laminates. Fire resistant glass laminates incorporating a waterglass based intumescent interlayer are sold by the Pilkington group of companies under the trade marks PYROSTOP and PYRODUR. These laminates are produced by pouring an aqueous waterglass solution onto the surface of a first glass pane and drying the solution in such a manner that a clear interlayer is formed. A second pane of glass is then placed on top of the first pane to form a laminate. Laminates containing more than two sheets of glass and more than one interlayer are also produced but are relatively thick and correspondingly expensive to produce.

When these laminates are exposed to a fire, the interlayer intumesces and expands to form a foam. The foam assists in preserving the structural integrity of the laminate for a longer period thereby maintaining a barrier to the propagation of the fire. The foam is also an insulator which reduces the amount of heat transmitted through the glazing and thereby inhibits the ignition of flammable material on the non-fire side of the glass.

The production of laminates having a waterglass based interlayer has been described in a number of patents including British Patents GB 1518958, GB 2199535 and United States patents U.S. Pat. No. 4,451,312, 4,626,301 and 5,766,770. The waterglass solutions proposed to be useful are the alkali metal silicates wherein the weight ratio $SiO_2:M_2O$ (wherein M represents an alkali metal) is in the range 2.5:1 to 5.0:1. The waterglass solutions used in practice in these patents and in the commercially available fire resistant glass laminates are sodium silicates wherein the ratio of $SiO_2:M_2O$ is 3.4:1 or greater. Sodium silicate waterglasses wherein the ratio $SiO_2:Na_2O$ is less than 3.3:1 have not been used in practice because they are viscous and thereby difficult to handle and dry to form a brittle interlayer which provides lower fire resistance and less impact resistance when incorporated into a fire resistant glazing.

U.S. Pat. Nos. 4,626,301 and 5,766,770 further disclose the incorporation of a polyhydric organic compound into the waterglass solution. The organic compound serves to reduce the incidence of cracking at the surface of the dried interlayer and in a fire helps maintain a barrier to the fire by binding the char. However since organic compounds are flammable the quantity used has been kept to a minimum in order not to provide a fuel for a fire. U.S. Pat. No. 5,766,770 states that the preferred such polyhydric compound is glycerol and that the interlayer should preferably contain less than 6% by weight of the organic compound.

SUMMARY OF THE INVENTION

We have now discovered fire resistant glass laminates having improved properties may be produced by forming a waterglass based composition comprising a sodium silicate waterglass solution wherein the ratio of $SiO_2:Na_2O$ is less than 3.0:1 together with a higher proportion of a polyhydric organic compound, drying that composition upon the surface of a glass sheet to form a fire resistant interlayer and forming a laminated glass comprising at least one such interlayer.

Other alkali metal silicate waterglasses especially potassium silicate waterglasses and lithium silicate waterglasses are also useful in the compositions of this invention. The ratio of $SiO_2:M_2O$ (wherein M represents an alkali metal) of these silicates should be adjusted in proportion with the different atomic weights of potassium and lithium. The invention will hereinafter be described with reference to sodium silicate waterglasses wherein the weight ratio $SiO_2:Na_2O$ is less than 3.0:1.

DESCRIPTION OF THE PREFERRED EMBODIMENTS

These waterglass based compositions are believed to be novel and accordingly from one aspect this invention provides a solution comprising a sodium silicate waterglass wherein the weight ratio of $SiO_2:Na_2O$ is less than 3.0:1 and a polyhydric organic compound in a quantity of at least 8% by weight of the solution and the said solution comprises from 30 to 70% by weight of water.

The most preferred polyhydric organic compound is glycerol. Other compounds which can be used but whose use is less preferred include other polyols such as ethylene glycol; monosaccharides and polysaccharides.

In the preferred embodiment where the polyhydric compound is glycerol the concentration of glycerol in the solution before that solution is dried is preferably at least 10% by weight. As the concentration of polyhydric compound increases the flexibility of the interlayer which is produced when the solution is dried increases. This tends to improve the impact resistance properties of the laminate. However the incorporation of an excessive proportion of the polyhydric compound can be disadvantageous particularly if the interlayer is relatively thick. These thicker, heavier interlayers suffer from a tendency to slump particularly when used in larger sized laminates and such laminates are not acceptable in use. Furthermore although the laminates of this invention have surprisingly good fire resistant properties increasing the quantity of polyhydric compound present contributes to the flammability of the interlayer and this may reduce the performance of the laminate in a fire test. For these reasons we prefer that the solution comprises no more than 20% of organic polyhydric compound. Most preferably the waterglass solution comprises from 14 to 18% by weight of organic polyhydric compound (prior to the drying step).

The alkali metal silicate waterglass is preferably a sodium silicate waterglass. These preferred waterglasses are preferably those wherein the weight ratio of $SiO_2:Na_2O$ is at least 2.0:1, more preferably at least 2.5:1 and most preferably at least 2.85:1. Sodium silicate waterglasses having a weight ratio of $SiO_2:Na_2O$ of 2.0:1; 2.5:1; 2.85:1 and 3.3:1 are available as articles of commerce. The compositions of the present invention preferably use the sodium silicate waterglasses having a ratio of $SiO_2:Na_2O$ of 2.0:1; 2.5:1 or 2.85:1 as they are commercially available. Waterglasses having a ratio of $SiO_2:Na_2O$ other than these specific ratios may be produced by blending the appropriate quantities of these commercially available materials.

Alkali metal silicate waterglasses other than sodium silicate waterglasses may be useful in the compositions of the present invention. Potassium silicate waterglasses and lithium silicate based waterglasses are particularly useful. In general these alternatives will be used as a partial replacement for the sodium silicate based waterglasses and in the preferred embodiments the molar ratio of sodium to either potassium or lithium will be at least 2:1.

In a particularly preferred embodiment the solutions of this invention comprise a mixture of a sodium waterglass and a potassium waterglass wherein the molar ratio of sodium to potassium is preferably at least 4:1. Where such a potassium silicate waterglass is present it will preferably have a ratio of $SiO_2$ to $K_2O$ in the range 1.43:1 to 2.05:1.

These solutions may conveniently be made up by adding the polyhydric organic compound slowly while stirring to an aqueous solution of the waterglass or waterglasses. The resulting solutions may be used in the production of fire resistant glazings using conventional techniques. Specifically the solutions may be spread upon the surface of a glass sheet which is provided with an edge barrier which retains the solution on the surface of the glass. The quantity of solution employed will vary according to the thickness of the interlayer that is desired. This quantity may be determined by routine experiment.

The solution is then dried under carefully controlled conditions of temperature and humidity so as to ensure the production of a clear transparent interlayer which is free from bubbles and other optical imperfections. The water content of the solution is reduced during the drying step to a level which is generally in the range 10 to 35% by weight (based on the total weight of the dried interlayer). The concentration of the organic polyhydric compound in the dried interlayer is correspondingly increased preferably to a value of from 10 to 40% by weight and more preferably a value of from 20 to 30% by weight. The waterglass provides the balance of the composition of the dried interlayer. Such dried interlayers are believed to be novel and comprise a further aspect of the invention.

The thickness of the dried interlayer will generally be in the range 0.5 to 2.0 mm. The fire resistant laminates of this invention preferably comprise at least one intumescent interlayer which is from 1.0 to 3.0 mm thick. The formation of thicker interlayers required longer drying times and is thereby disadvantageous. Thinner interlayers require correspondingly shorter drying times and laminates comprising a thicker interlayer may conveniently be produced by bringing two sheets of glass having a thinner interlayer say from 0.5 to 1.0 mm thick into face to face contact so as to form an interlayer which would be from 1.0 to 2.0 mm thick.

Flat glass sheets of various thicknesses may be used in the laminates of the present invention. Typically sheets of soda lime float glass having a thickness of from 2.0 to 4.0 mm may be used.

The edge barrier is normally cut away at the completion of the drying stage to leave a glass sheet having a dried interlayer on one surface thereof. A laminate may be formed by placing a second glass sheet above the first sheet. In an alternative embodiment the second glass sheet may itself be one having a fire resistant interlayer mounted upon one surface thereof. The second sheet may be mounted with this interlayer adjacent to the first interlayer so as to provide a two-pane laminate having a relatively thick interlayer. More commonly the second glass sheet is mounted with the interlayer on its upper surface and a third glass sheet mounted upon that so as to provide a laminate comprising three glass sheets and two interlayers. Laminates having as many as eight interlayers have been manufactured to meet particularly stringent fire safety requirements.

We have also discovered that the flexibility and strength of the dried films of this invention may be sufficient to allow them to be removed from the surface of the substrate on which they have been formed. The films formed in this fashion may be laid upon the surface of a glass sheet and cut to size as necessary to form a glass sheet having a dried interlayer on one surface thereof. A second glass sheet may then be placed on top of the first to form a laminate comprising two sheets of glass and a dried interlayer.

These films may be formed by drying a waterglass solution according to the invention on a substrate which may be a glass substrate or may be any substrate having a flat surface on which the solution may be dried and subsequently removed.

Thus from another aspect this invention provides a method for the production of a fire resistant glazing which comprises pouring a solution of comprising a sodium silicate waterglass wherein the ratio $SiO_2:Na_2O$ is less than 3.0:1.0 and at least 8% by weight of a polyhydric compound onto a flat surface, drying that solution under controlled conditions to produce an elastomeric foil, separating said foil from said surface, placing the foil onto the surface of a first glass sheet and placing a second glass sheet on top of said foil.

The waterglass solutions which are preferred for use in this aspect of the invention typically comprise from 30 to 70% by weight of water prior to the drying step and from 10 to 35% by weight of water after the drying step. Preferably the polyhydric compound is glycerol.

The waterglass solutions of this invention may also contain other additives known as being useful. In particular they may comprise at least one zirconium containing anionic aggregate. The useful aggregates include all those described in our published International patent application WO 01/10638. An example of a useful zirconium-containing compound is potassium zirconium carbonate. The presence of a quantity of such an aggregate as will provide at least 0.5% by weight of zirconium in the dried interlayer has been found to improve the fire resistance performance of the glass.

The invention is illustrated by the following examples:

EXAMPLE 1

A series of compositions comprising an alkali metal waterglass were made using the following technique.

A series of waterglass solutions were used:

(A) A solution of a sodium silicate waterglass having a weight ratio of $SiO_2:Na_2O$ of 3.3:1 and comprising 38.1% by weight of solids; sold by the Crosfield Company of Warrington, England, as Crystal 79 sodium silicate solution;
(B) A solution of a sodium silicate waterglass having a weight ratio of $SiO_2:Na_2O$ of 2.85:1 and comprising 43.2% by weight of solids; sold by the Crosfield Company as Crystal 96 Sodium Silicate;
(C) A solution of a sodium silicate waterglass having a weight ratio of $SiO_2:Na_2O$ of 2.5:1 and comprising 43.6% by weight of solids; sold by the Crosfield Company as Crystal 0503 Sodium Silicate;
(D) A solution of a potassium silicate waterglass having a weight ratio of $SiO_2:K_2O$ of 1.43:1, comprising 52.4% by weight of solids; sold by the Crosfield Company as Crystal K120 Potassium Silicate.

These solutions were mixed with the appropriate quantity of glycerol to provide the compositions whose formulations are set out in Table 1. The amounts of sodium silicate and potassium silicate are expressed as the weight of the appropriate aqueous solution A, B, C or D. In all cases the balance to 100% of the formulation is provided in the form of the sodium silicate solution. For formulations 12 to 15 the sodium silicate waterglass and the potassium silicate waterglass were initially mixed together in a paddle mixer rotating at 500 rpm until a solution that was visibly homogeneous was formed. The glycerol was then added gradually to the mixture with thorough stirring. In the case of formulations 1 to 8 the glycerol was added to the sodium silicate waterglass.

These mixed compositions were poured onto an edge barriered glass pane at a fill level of between 3.5 kg/m² and 5.0 kg/m². The glass panes were formed from soda lime float glass having the thickness in mm shown in column 4 of Table 1. The solutions were dried under carefully controlled conditions of temperature and humidity until a dried interlayer having a thickness of 1.4 mm and a water content of approximately 25% by weight (as measured by a Karl Fischer titration) had formed. The laminates having a thickness of 1.4 mm were formed by placing a top glass on top of this dried interlayer. The laminates having a thickness of 2.8 mm were formed by taking two sheets of glass each having an interlayer dried upon one surface and bringing the interlayers into contact with one another.

Laminates of the sizes recited in columns 6 to 9 of Table 1 were cut. Their Fire Performance and Impact Performance were measured using the methodologies identified in the column headings. The results are reported in columns 6 to 9.

Examples 1 and 2 are Comparative Examples illustrating the performance of conventional formulations. These conventional formulations fail all the impact tests. Examples 3 to 15 are examples of compositions according to the present invention. All pass the Class C impact test recited in British Standard 6206 and formulations 3.4.6 and 11 to 14 pass the more onerous DIN 52337 Class B test. The Fire Performance of formulations 3 to 15 is not significantly different from that of the Comparative formulations 1 and 2.

TABLE 1

| | Formulation | | | Glazing Structure | | Fire Performance BS 476 Parts 20–22 PASS - 30 Mins | | Impact Performance | |
| | Sodium silicate ratio $SiO_2:Na_2O$ | Glycerol (%) | Potassium silicate ratio $SiO_2:K_2O$ 1.43 | Glass thickness | Interlayer thickness | 1940 × 940 mm | 2300 × 1200 mm | Class B - 700 mm DIN 52337 | Class C - 305 mm BS 6206 |
|---|---|---|---|---|---|---|---|---|---|
| 1 | 3.30 | 6 | | 3 | 1.4 | 40 | 30 | FAIL | FAIL |
| 2 | 3.30 | 6 | | 3 | 2.8 | 50 | 40 | FAIL | FAIL |
| 3 | 2.50 | 18 | | 3 | 1.4 | 20 | | PASS | PASS |
| 4 | 2.50 | 14 | | 3 | 1.4 | 37 | 23 | PASS | PASS |
| 5 | 2.50 | 10 | | 3 | 1.4 | 40 | 23 | FAIL | PASS |
| 6 | 2.85 | 18 | | 3 | 1.4 | 25 | | PASS | PASS |
| 7 | 2.85 | 14 | | 3 | 1.4 | 40 | | FAIL | PASS |
| 8 | 2.85 | 12 | | 3 | 1.4 | 42 | 23 | FAIL | PASS |
| 9 | 2.85 | 12 | | 4 | 1.4 | 45 | 37 | FAIL | PASS |
| 10 | 2.50 | 10 | | 4 | 2.8 | 36 | | FAIL | PASS |
| 11 | 2.85 | 11 | | 4 | 2.8 | 45 | 29 | PASS | PASS |
| 12 | 2.85 | 10 | 2.5 | 4 | 2.8 | 38 | 37 | PASS | PASS |
| 13 | 2.85 | 10 | 5 | 4 | 2.8 | 36 | | PASS | PASS |
| 14 | 2.85 | 10 | 20 | 4 | 2.8 | 25 | — | PASS | PASS |
| 15 | 2.50 | 14 | 20 | 3 | 1.0 | 35 | — | FAIL | PASS |

The invention claimed is:

1. A glass sheet having a clear dried interlayer upon one surface thereof produced by pouring a solution onto the surface of the glass and drying it under controlled conditions, said solution comprising sodium silicate waterglass, in which the weight ratio of $SiO_2:Na_2O$ is less than 3.0, at least 8% by weight of water soluble polyhydric organic compound, and from 30 to 70% by weight of water, wherein during the drying step the water content of the solution is reduced to between 10 and 35% by weight of the dried interlayer and the concentration of the organic polyhydric organic compound is increased to between 10 and 40% by weight of the dried interlayer.

2. A glass sheet according to claim 1, wherein the clear dried interlayer is from 0.5 mm to 2.0 mm thick.

* * * * *